(12) United States Patent
Henriksen

(10) Patent No.: US 10,929,465 B2
(45) Date of Patent: Feb. 23, 2021

(54) METHOD AND APPARATUS FOR PROCESSING REQUESTS FOR THUMBNAIL IMAGES IN A VIDEO SURVEILLANCE SYSTEM

(71) Applicant: CANON KABUSHIKI KAISHA, Tokyo (JP)

(72) Inventor: Nicolai Henriksen, Brondby (DK)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/679,029

(22) Filed: Nov. 8, 2019

(65) Prior Publication Data

US 2020/0159768 A1 May 21, 2020

(30) Foreign Application Priority Data

Nov. 19, 2018 (GB) .................................... 1818794

(51) Int. Cl.
*G06F 16/74* (2019.01)
*G06F 16/783* (2019.01)
*G06F 16/738* (2019.01)
*G06F 16/732* (2019.01)

(52) U.S. Cl.
CPC ........ *G06F 16/739* (2019.01); *G06F 16/7335* (2019.01); *G06F 16/74* (2019.01); *G06F 16/783* (2019.01)

(58) Field of Classification Search
CPC .... G06F 16/739; G06F 16/7335; G06F 16/74; G06F 16/783; H04N 21/472
See application file for complete search history.

(56) References Cited

U.S. PATENT DOCUMENTS

| 2010/0077107 | A1 | 3/2010 | Lee et al. |
| 2014/0214885 | A1* | 7/2014 | Park ...................... G06F 16/783 707/769 |
| 2014/0373020 | A1 | 12/2014 | Govindarajeswaran et al. |

(Continued)

FOREIGN PATENT DOCUMENTS

| CN | 106484755 A | 3/2017 |
| WO | 2010/006132 A2 | 1/2010 |

*Primary Examiner* — Thai Q Tran
*Assistant Examiner* — Jose M Mesa
(74) *Attorney, Agent, or Firm* — Canon U.S.A., Inc. IP Division

(57) ABSTRACT

In a video surveillance system comprising a plurality of recording servers, each storing video data received from at least one video surveillance camera, a method of processing requests for thumbnail images comprises receiving a thumbnail request to a main queue 200. The thumbnail request includes information indicating a specific video camera and a specific recording server. The thumbnail request is allocated to a recording server queue 250 corresponding to the specific recording server. It is determined whether an idle resource processor 260 associated with the recording server queue is available to process the thumbnail request. If no idle resource processor is available, then it is determined how many resource processors are associated with the recording server queue and, if this is less than a maximum number, a new resource processor is initiated for processing the thumbnail request and the new resource processor is put into an idle state after processing the thumbnail request.

18 Claims, 4 Drawing Sheets

(56) References Cited

U.S. PATENT DOCUMENTS

| | | | |
|---|---|---|---|
| 2015/0188971 A1* | 7/2015 | Yoon | H04L 67/20 |
| | | | 709/219 |
| 2016/0088326 A1* | 3/2016 | Solomon | H04N 21/254 |
| | | | 725/12 |
| 2017/0099463 A1 | 4/2017 | Trani | |
| 2017/0134532 A1 | 5/2017 | Bøgelund et al. | |

\* cited by examiner

METHOD AND APPARATUS FOR PROCESSING REQUESTS FOR THUMBNAIL IMAGES IN A VIDEO SURVEILLANCE SYSTEM

CROSS-REFERENCE TO RELATED APPLICATIONS

This application claims the benefit under 35 U.S.C. § 119(a)-(d) of United Kingdom Patent Application No. 1818794.8, filed on Nov. 19, 2018 and titled "METHOD AND APPARATUS FOR PROCESSING REQUESTS FOR THUMBNAIL IMAGES IN A VIDEO SURVEILLANCE SYSTEM". The above cited patent application is incorporated herein by reference in its entirety.

BACKGROUND OF THE INVENTION

The present invention relates to a method and apparatus for processing requests for thumbnail images in a video surveillance system.

A video surveillance system typically comprises a plurality of recording servers, each of which receives and stores video data from a plurality of video cameras. A client device on which a user can view live or recorded video data may be a mobile device or an operator console, such as a PC, including a display. The client device can request either a live stream or recorded data from any camera by connecting to the recording server to which the specific camera sends video data for storage.

The client device also provides a search facility for a user to search video data stored on the recording servers. Various search criteria may be used, and various video analytics software may be used to determine search results. For example, the search may be based on object or facial recognition, or motion. The search may be carried out by searching metadata associated with the stored video data.

Search results may be displayed to the user on the display in the form of a plurality of thumbnail images, each of which represents a time segment of video data which satisfies the search criteria. The thumbnail image is a representative frame from the time segment of video. The user can then click on each thumbnail image to view the segment of video data. The results list can potentially contain thousands of results, each being displayed with a thumbnail of the associated segment of video recording. Fetching such a thumbnail from the appropriate recording server can be an expensive operation (time- and memory-wise). In order to retrieve a thumbnail image, it is necessary to initialize a resource processor which is responsible for communicating with the appropriate recording server and fetching the thumbnail. The initialisation of the resource processor is what can be time and memory consuming because of a handshake or login process and exchanging of session tokens etc.

Users will also expect results to be displayed quickly, so the thumbnails must be fetched in parallel. This quickly escalates into memory issues if thumbnails are just fetched on demand and will add a lot of unnecessary overhead with establishing the resource processor delivering the thumbnail. This puts unwanted pressure on both the client device as well as the recording servers which are responsible for delivering the thumbnails; potentially making either of them run out of memory and crash.

SUMMARY OF THE INVENTION

The present invention provides a method of processing requests for thumbnail images in a video surveillance system comprising a plurality of recording servers, each storing video data received from at least one video surveillance camera, comprising:

receiving a thumbnail request to a main queue, the thumbnail request including information indicating a specific video camera from which a thumbnail image is requested and a specific recording server on which video data from the specific video camera is stored;

allocating the thumbnail request to a recording server queue corresponding to the specific recording server;

determining whether an idle resource processor associated with the recording server queue is available to process the thumbnail request;

if an idle resource processor is available, processing the thumbnail request using the resource processor;

if no idle resource processor is available:
  (i) determining how many resource processors are associated with the recording server queue;
  (ii) if this is less than a maximum number, initiating a new resource processor and processing the thumbnail request; and
  (iii) putting the new resource processor into an idle state after processing the thumbnail request.

Accordingly, rather than initialising a new resource processor for every thumbnail request, resource processors are put into an idle state so they can be re-used. This reduces the amount of time and memory that is used by unnecessary initialisation processes which require handshakes and exchanges of session tokens between the client device and the recording server. Furthermore, the number of resource processors in each recording server queue is limited to a maximum number.

The invention further provides a computer program that, when executed by a processor, is configured to control the processor to perform a process comprising the steps of the method set out above, and a computer readable storage medium tangibly encoded with a computer program executable by a processor to perform actions comprising the steps of the method.

The invention further provides a client device configured to process requests for thumbnail images in a video surveillance system comprising a plurality of recording servers, wherein each recording server stores video data received from at least one video surveillance camera, the client device comprising:

a main queue configured to receive a thumbnail request including information indicating a specific video camera from which a thumbnail image is requested and a specific recording server on which video data from the specific video camera is stored;

thumbnail request processing means configured to:
  allocate the thumbnail request to a recording server queue corresponding to the specific recording server;
  determine whether an idle resource processor associated with the recording server queue is available to process the thumbnail request;
  if an idle resource processor is available, process the thumbnail request using the resource processor;
  if no idle resource processor is available:
    (i) determine how many resource processors are associated with the recording server queue;
    (ii) if this is less than a maximum number, initiate a new resource processor and process the thumbnail request; and (iii) put the new resource processor into an idle state after processing the thumbnail request.

BRIEF DESCRIPTION OF THE DRAWINGS

Embodiments will now be described, by way of example only, with reference to the accompanying drawings, in which.

DETAILED DESCRIPTION

Figure 1:
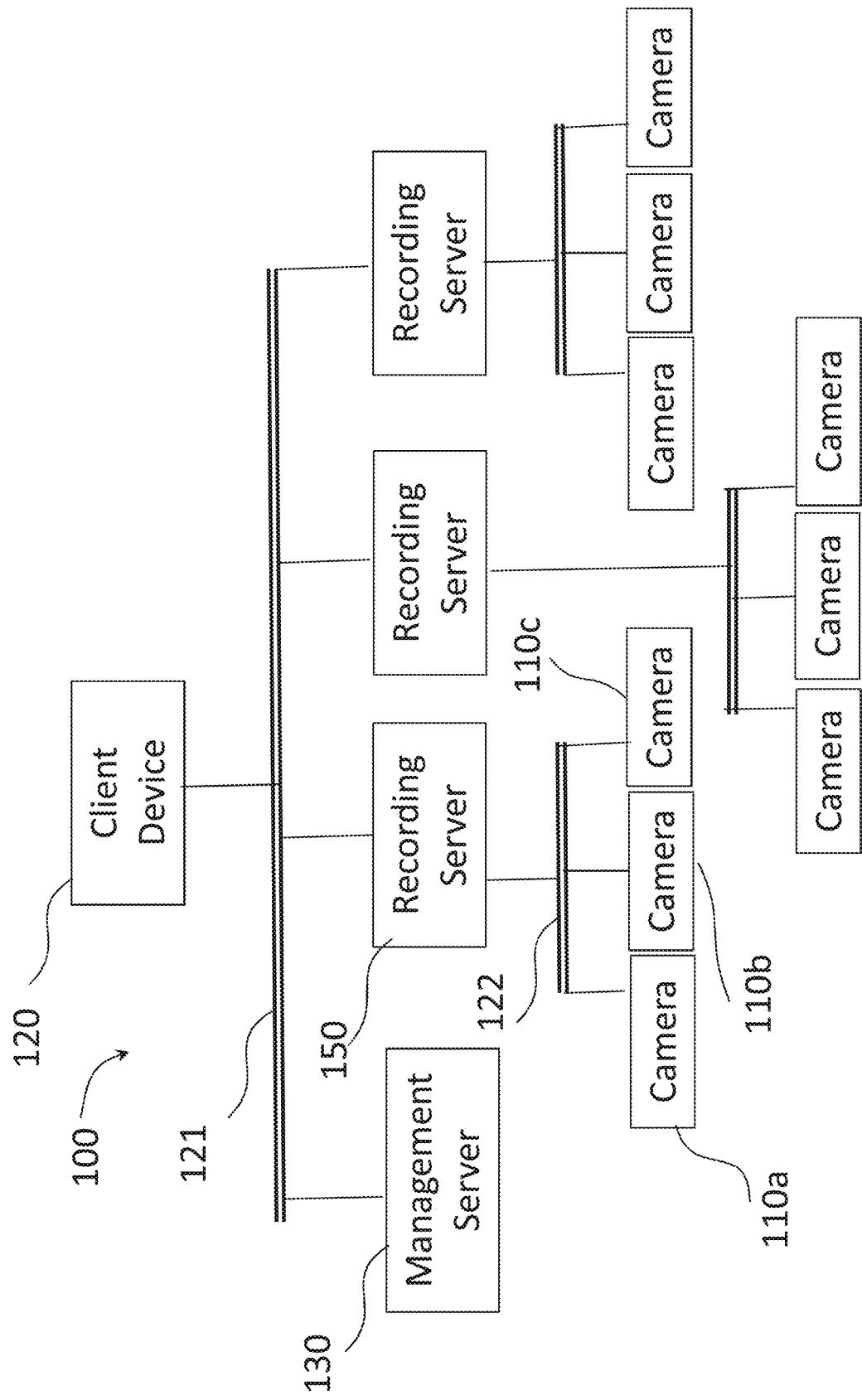
FIG. 1 illustrates a video surveillance system.

FIG. 1 shows an example of a video surveillance system 100 in which embodiments of the invention can be implemented. The system 100 comprises a management server 130 and a plurality of recording servers 150. A plurality of video surveillance cameras 110a, 110b, 110c send video data to each recording server 150. Therefore, each camera has a corresponding recording server on which video data from that camera is stored. The cameras 110a, 110b, 110c capture image data and send this to their respective recording servers 150 as a plurality of video data streams. The recording servers 150 store the video data streams captured by the video cameras 110a, 110b, 110c, and can stream either live or stored data onwards to a client device 120.

The client device 120 provides an interface via which an operator can view video data live from the cameras 110a, 110b, 110c, or recorded video data from the recording servers 150. The client device 120 further provides a search interface via which a user can carry out searches, for example based on facial recognition or motion detection. The searches may involve analysing the video data itself, for example a motion based search. In this case a request is issued to the recording server 150 which carries out the search. Alternatively, the searches may be searches of metadata which has been generated by analytics software, in which case a request might be sent to a metadata indexing server (not shown) which searches the metadata and returns a result indicating video segments which match the search criteria.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When the client device 120 is connected to the system, or a user logs in, the management server 130 determines if the user is authorised to view video data. The management server 130 also initiates an initialisation or set-up procedure during which the management server 130 sends configuration data to the client device 120. The configuration data defines the cameras in the system, and which recording server each camera is connected to. The client device 120 then stores the configuration data locally in a cache. The configuration data comprises the information necessary for the client device 120 to identify cameras and obtain data from cameras and/or recording servers. The management server 130 also communicates with the client device 120 if a change is made that requires the client device 120 to update its configuration data. For example, if a recording server is added or removed from the system, or a new camera is added and associated with a particular recording server. Hence, the client device 120 is able to identify which recording server video data from a particular camera is stored on.

Similarly, configuration data is sent from the management server 130 to the recording server 150 during an initialisation or set-up procedure. If any changes are made to any settings at the management server 130 which are relevant to a particular recording server 150, the management server communicates these changes to the particular recording server 150 so that the recording server 150 can update its configuration data accordingly.

Thus, the management server maintains a "master copy" of configuration data for client devices and recording servers and will send data to the client devices and recording servers to update their configuration data as and when any relevant change is made at the management server 130.

The client device 120 is provided for use by a security guard or other user in order to monitor or review the outputs of the cameras 110a, 110b, 110c. The client device 120 may be a fixed console such as a PC or could be a mobile device connected to the video management system via a network. The client device 120 includes a display which can display an interface for interacting with the management software on the management server 130. The client device 120 can request video data streams from one or more of the cameras 110a, 110b, 110c to view video in real time, or the client device 120 can request recorded video data stored in any of the recording servers 150.

The client device 120 is configured to communicate via a first network/bus 121 with the management server 130 and the recording servers 150. Each recording server 150 communicates with the cameras 110a, 110b, 110c via a second network/bus 122.

The client device 120 can run searching software for searching the video data for events. Various search criteria may be used, and various video analytics software may be used to determine search results. For example, the search may be based on object or facial recognition, or motion. The search may be carried out by searching the video data itself or metadata associated with the stored video data. The searches may involve analysing the video data itself, for example a motion based search. In this case a request is issued to the recording server 150 which carries out the search. If the searches are searches of metadata which has been generated by analytics software, a request might be sent to a metadata indexing server (not shown) which searches the metadata and returns a result indicating which video segments match the search criteria. However, common to the different search methods is that each will return search results as data indicating a segment of video and a "trigger time" which indicates where the search hit is found in the video segment.

Search results are displayed to the user on the display in the form of a plurality of thumbnail images, each of which represents a time segment of video data which satisfies the search criteria. The thumbnail image is a representative JPEG frame from the time segment of video, taken at the "trigger time". The "trigger time" will depend on the type of search. For example, in a motion based search, the "trigger time" and the thumbnail image selected for display will be the first image in the video segment in which motion is detected. If the search is a metadata search for, for example "red cars" then the "trigger time" will be the first frame in which a red car has been identified. The "trigger time" will not necessarily be the first frame in the video segment, as typically the search will be configured to provide resulting video segments which will start a predetermined interval before the "trigger time". When the search results are displayed, the user can then click on each thumbnail image to view the segment of video data.

In order for the client device 120 to retrieve a thumbnail image, it is necessary for the client device 120 to first identify the recording server 150 on which the video data from which the thumbnail is to be extracted is stored and then initialize a resource processor which is responsible for communicating with the appropriate recording server 150 and fetching the thumbnail. The initialisation of the resource processor involves a login process between the client device 120 and the recording server 150, including a handshake and exchange of session tokens etc.

Figure 2:
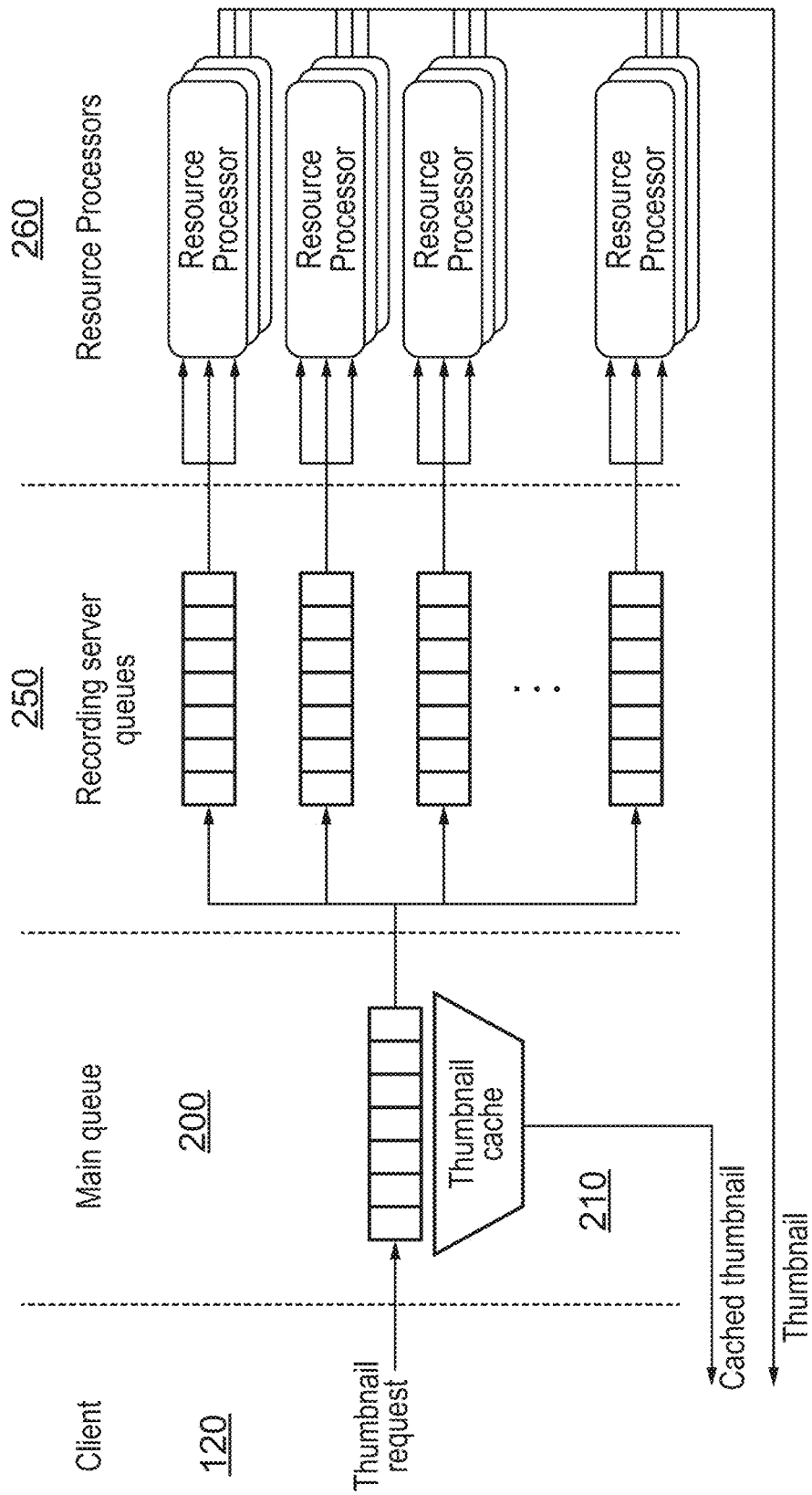
FIG. 2 is a schematic diagram of the arrangement of queues.

FIG. 2 is a schematic diagram of a nested queue system for processing thumbnail requests by the client device 120.

The client device 120 submits a thumbnail request to a main queue 200. When a thumbnail request is submitted to the main queue 200, it is first checked whether the required thumbnail is present in a thumbnail cache 210. If it is, then the thumbnail is extracted from the thumbnail cache 210 and returned to the client. The main queue 200 then processes each thumbnail request one by one, and inspects the request to determine which recording server 150 the thumbnail image must be fetched from. It then passes the request to a recording server queue 250 corresponding to the recording server 150 from which the thumbnail is to be fetched. If a recording queue 250 does not exist for the required recording server 150, a new recording server queue 250 is created, subject to a limitation configuration which will be set out in more detail below. If no appropriate recording server queue 250 exists and a new one cannot be created due to the limitation configuration, the thumbnail request remains in the main queue 200 for later processing. The main queue 200 will continue to pass on thumbnail requests to their appropriate recording server queue 250 until the client device 120 disposes the main queue 200, which will usually only occur when the client device 120 shuts down.

Each recording server queue 250 processes thumbnail requests sent to the queue one by one and inspects the request to see which camera the request is associated with. It then passes the request on to an appropriate resource processor 260 which is responsible for actually fetching the thumbnail for the desired camera from the appropriate recording server 150. If a resource processor 260 associated with the appropriate camera does not exist, a new one is created and initialised, subject to a limitation configuration which will be set out in more detail below. If no appropriate resource processor 260 exists and a new one cannot be created due to the limitation configuration, the thumbnail request remains in the recording server queue 250 for later processing.

Each recording server queue 250 will continue to pass on thumbnail requests to their appropriate resource processor 260 until the recording server queue 250 has either been idle for too long (idle timer timeout) or the main queue 200 has requested it to shut down. The idle timer timeout occurs when the recording server queue 250 has no pending thumbnail requests (or requests being processed) and has not received a new thumbnail request for a predetermined time period. The main queue 200 may request a recording server queue 250 to shut down if the recording server queue 250 has no pending thumbnail requests (or requests being processed) and a new recording server queue 250 is required and the limit has been reached on the number of recording queues present. This may occur if the recording server queue 250 is idle but has not yet reached the idle timer timeout period.

Once the resource processor 260 has fetched a thumbnail, it returns the result to the client device 120, but also places the thumbnail in the thumbnail cache 210.

The thumbnail cache 210 stores recently retrieved thumbnails so that if a new request for the same thumbnail is received by the main queue 200, it can be extracted from the thumbnail cache.

The thumbnail cache 210 has a predetermined capacity, and once it reaches full capacity, thumbnails are deleted on a least recently used basis. Furthermore, each thumbnail has an expiry period, so that if a thumbnail has been in the thumbnail cache 210 for the expiry period without being used, it is automatically deleted from the cache 210.

When first created, a resource processor 260 needs to initialise. This can be time consuming because of a login process between the client device 120 and the recording server 150 and exchanging of session tokens etc. Once initialised, the resource processor 260 can be used multiple times to handle requests for the same camera from the same recording server. Once a resource processor 260 has processed a request, it transitions into an idle state where it can be reactivated by the recording server queue 250 if a new request for the same recording server and camera needs processing. If the resource processor 260 is restarted while in the idle state, it can either process the request directly (if it is for the same camera), or it can re-initialise and process the request if it is for a different camera. In this case, only a small performance optimisation is achieved. If the resource processor 260 is idle for a predetermined time period, it is shut down to reduce memory load.

Limit Configuration

The main queue is initialised with a "limit configuration", which sets limits on the numbers of recording server queues and resource processors that can be active at any time. The limit configurations are set out below.

Maximum Concurrent Recording Server Queues

This defines the absolute maximum number of recording server queues that can be active at any given moment. If a new recording server queue is required because the main queue is processing a thumbnail request that requires a thumbnail image from video data stored on a recording server for which there is not a currently active recording server queue, then it is checked whether the total number of recording server queues has reached the maximum number of concurrent recording server queues. If the maximum number has not been reached, a new recording server queue can be initiated. If the maximum number has been reached, then it is determined whether any idle recording server queues are present. An idle recording server queue has no pending thumbnail requests in the queue but has not yet reached the idle timeout period. If an idle recording server queue is present, it can be shut down and a new recording server queue can be initiated. If there are no idle recording server queues, then the thumbnail request remains in the main queue for later processing.

Maximum Resource Processors Per Recording Server

This defines the absolute maximum number of resource processors for a given recording server queue at any given moment. If the maximum number of resource processors is reached, then the next thumbnail request will be sent to an idle resource processor, and if no idle resource processors are available then the thumbnail request remains in the recording server queue.

Maximum Concurrent Requests being Handled in Total

This defines the absolute maximum of thumbnail requests that can be handled at any given time across all of the recording server queues (ie resource processors that are handling requests not including idle resource processors). If this maximum is reached, then the next thumbnail request in a recording server queue will remain in the recording server queue even if the maximum resource processors per recording server has not been reached. The thumbnail request will remain in the recording server queue until a request has finished processing and a resource processor is available.

Maximum Recording Server Queue Idle Time

This defines the idle timer timeout period for which a recording server queue can remain idle (ie with no thumbnail requests in the queue or being processed by resource processors) before it automatically shuts down.

Maximum Resource Processor Idle Time

This defines the time period for which a resource processor can be idle (ie not processing a thumbnail request) before it is automatically shut down.

Thumbnail Cache Enabled

This determines whether or not the Thumbnail Cache 210 is enabled. If disabled, all requests will have to be processed all the way through the queues.

Maximum Thumbnail Cache Capacity

This defines the absolute maximum number of thumbnails that can be cached in the Thumbnail Cache 210. The cache is implemented as a Least Recently Used (LRU) cache, so if the maximum is reached, and a new thumbnail is added, the thumbnail which has been in the cache for the longest period without being used (ie fetched) is removed from the cache, and the new thumbnail is added instead.

Thumbnail Cache Expiration Time

This defines the maximum time period that a thumbnail can remain in the thumbnail cache 205 without being used (ie fetched). If this limit is reached, the thumbnail is automatically removed from the thumbnail cache 210 to minimise memory consumption.

Figure 3:
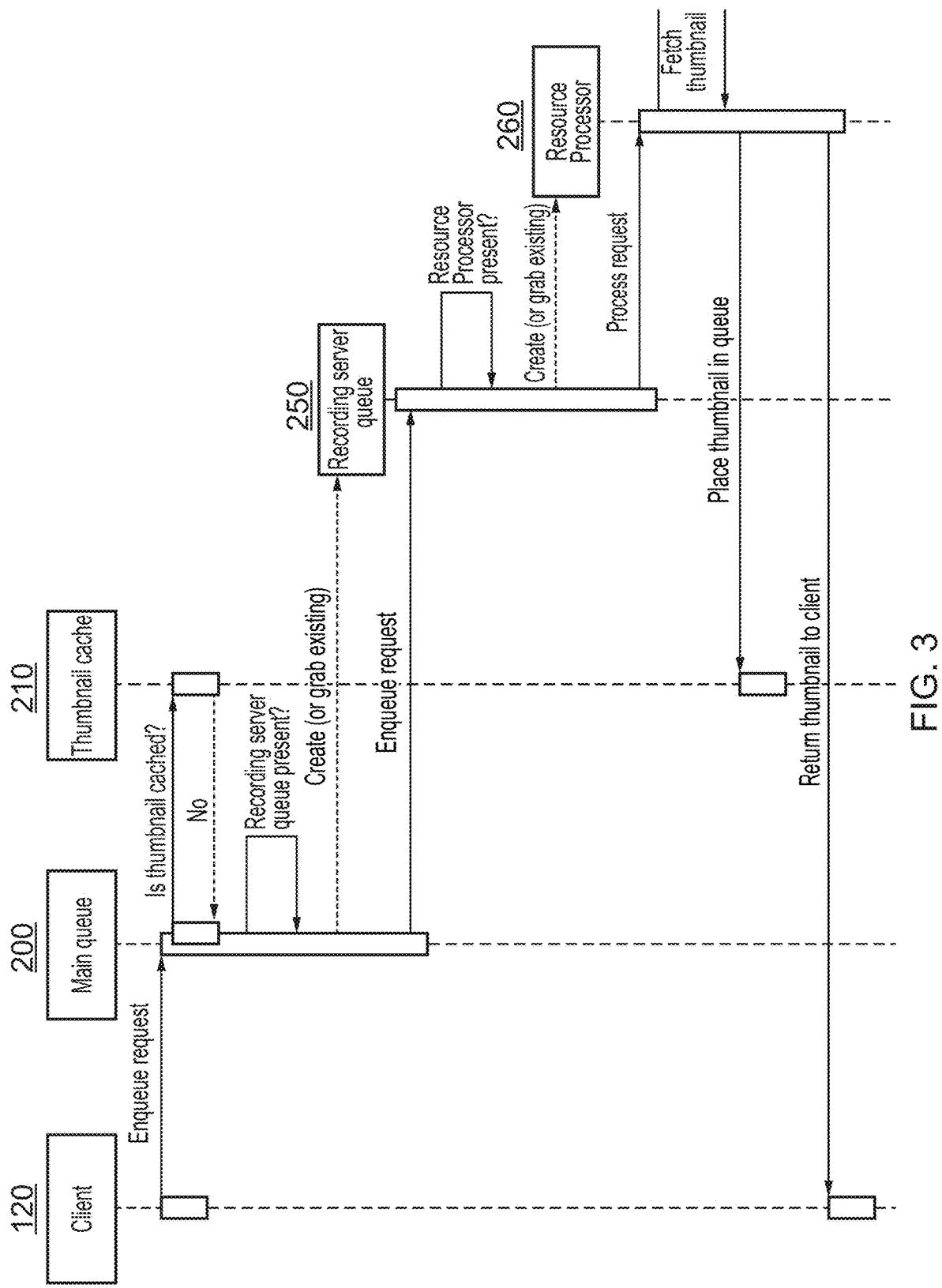
FIG. 3 illustrates a sequence of processing a thumbnail request.

FIG. 3 illustrates one possible flow of a thumbnail request through the queue.

First the client device 120 submits the thumbnail request to the main queue 200, which first checks the thumbnail cache 210 and determines that the requested thumbnail is not in the thumbnail cache 210.

The main queue 200 then checks which recording server 150 the thumbnail is required from, and whether there is a corresponding recording server queue 250. It then either passes the request to an existing recording server queue, or creates a new one, subject to the above limit configuration, or retains the request in the main queue 200 until creation of a new recording server queue is permitted by the limit configuration.

When the thumbnail request is passed to the recording server queue 250, the recording server queue checks whether an appropriate resource processor 260 is available for the camera from which the thumbnail image is required. If there is an appropriate resource processor 260 which is idle, the request is processed by that resource processor 260. If there is no appropriate resource processor and the limit configuration allows, then a new resource processor 260 is initiated to process the request. If the limit configuration does not allow the initialisation of a new resource processor, then the thumbnail request remains in the recording server queue 250 until the initialisation of a new resource processor is possible.

When a resource processor 260 processes a thumbnail request it fetches the thumbnail from the video data stored on the recording server and places the thumbnail image in the thumbnail cache 210 and returns it to the client.

Figure 4:
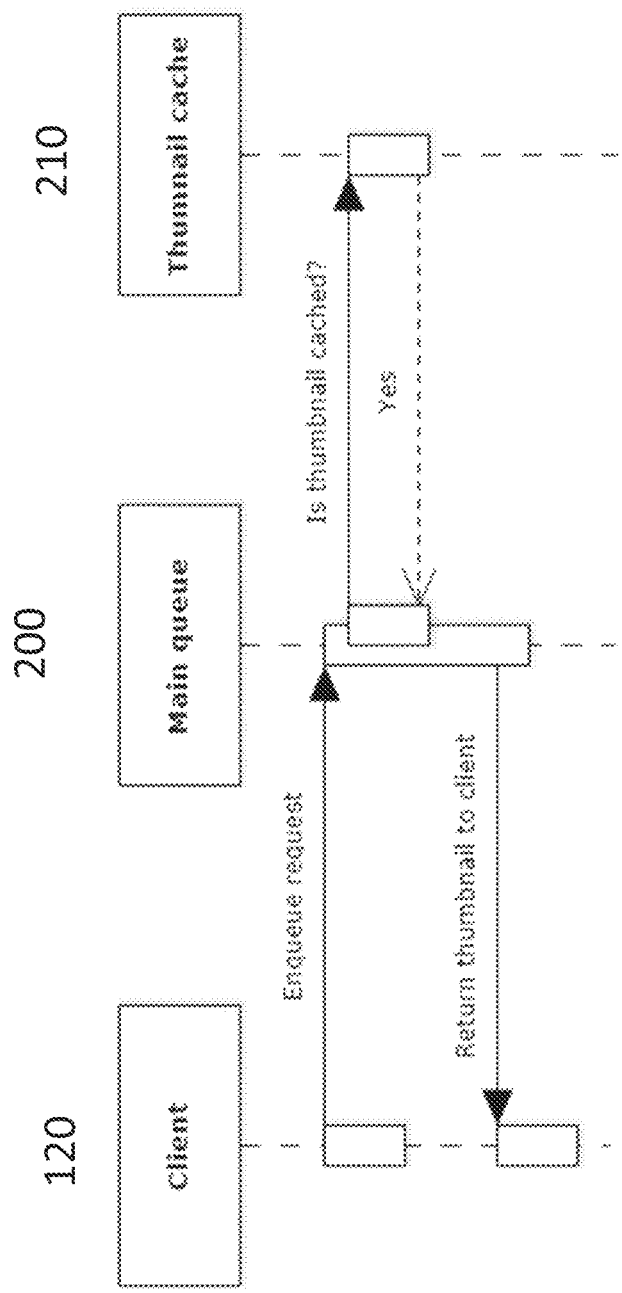
FIG. 4 illustrates an alternative sequence of processing a thumbnail request.

FIG. 4 illustrates another possible flow of a thumbnail request, when the thumbnail image requested is one which has been previously requested and is stored in the thumbnail cache 210. The thumbnail request is submitted to the main queue 200, which checks whether the requested thumbnail is in the thumbnail cache 210, and finds that it is in the thumbnail cache 210, retrieves it and returns it to the client.

While the present invention has been described with reference to embodiments, it is to be understood that the invention is not limited to the disclosed embodiments. The present invention can be implemented in various forms without departing from the principal features of the present invention as defined by the claims.

The invention claimed is:

1. A method of processing requests for thumbnail images in a video surveillance system comprising a plurality of recording servers, each storing video data received from at least one video surveillance camera, comprising:
   receiving a thumbnail request to a main queue, the thumbnail request including information indicating a specific video camera for which a thumbnail image is requested and a specific recording server on which video data from the specific video camera is stored;
   allocating the thumbnail request to a recording server queue corresponding to the specific recording server;
   determining whether an idle resource processor associated with the recording server queue is available to process the thumbnail request;
   when the idle resource processor is available, processing the thumbnail request using the idle resource processor;
   when no idle resource processor is available:
      (i) determining how many resource processors are associated with the recording server queue;
      (ii) when this is less than a maximum number, initiating a new resource processor and processing the thumbnail request; and
      (iii) putting the new resource processor into an idle state after processing the thumbnail request.

2. The method of claim 1, wherein when the maximum number of resource processors are associated with the recording server queue, the thumbnail request is held in the recording server queue until a resource processor becomes available.

3. The method of claim 1, wherein when a resource processor has been in an idle state for a predetermined period of time without processing a thumbnail request it is terminated.

4. The method of claim 1, wherein each resource processor is associated with a video camera, and the step of determining whether an idle resource processor is available to process the thumbnail request comprises determining whether an idle resource processor is available which is associated with the specific camera from which the thumbnail image is required.

5. The method of claim 4 wherein, when no idle resource processor is available which is associated with the camera from which the thumbnail image is required and the maximum number of resource processors are associated with the recording server, the method comprises determining whether there are any idle resource processors associated with the recording server and, terminating one of the idle resource processors and initiating a new resource processor associated with the camera from which the thumbnail image is required.

6. The method of claim 1, wherein there is a maximum total number of active resource processors which can be active across all of the recording server queues, and the method comprises, before initiating a new resource processor or activating an idle resource processor, checking when the maximum total number of active resource processors has been reached.

7. The method of claim 6 wherein, when the maximum total number of active resource processors has been reached, maintaining the thumbnail request in the recording server queue.

8. The method claim 1 wherein, when a thumbnail request is processed, a thumbnail image is retrieved from the recording server and stored in a thumbnail cache.

9. The method of claim 8 wherein, when the thumbnail request is received by the main queue, determining when the requested thumbnail image is stored in the thumbnail cache and, when it is, retrieving the thumbnail image from the thumbnail cache.

10. The method of claim 8, wherein the thumbnail cache has a maximum capacity and when the maximum capacity is reached, the least recently used thumbnail image is deleted from the thumbnail cache.

11. The method of claim 8, wherein thumbnail images are deleted from the thumbnail cache when they have not been used for a predetermined time period.

12. The method of claim 1 wherein, when a recording server queue has no pending thumbnail requests and has not received a new request for a predetermined period of time, it is terminated.

13. The method of claim 1 wherein, when a recording server queue corresponding to a recording server on which video data from the specific video camera is stored is not present, the method comprises determining when a total number of recording server queues is less than a maximum number and, when it is, generating a new recording server queue corresponding to the recording server on which video data from the specific video camera is stored.

14. The method of claim 13 wherein, when the maximum number of recording server queues has been reached and a new recording server queue is required and one of the recording server queues has no pending thumbnail requests, the recording server queue with no pending thumbnail requests is terminated and the new recording server queue is initiated.

15. The method of claim 1, wherein the method is carried out by a client device in the video surveillance system.

16. The method of claim 15, wherein the initialising of a new resource processor comprises a login process and exchanging of session tokens between the recording server and the client device.

17. A non-transitory computer readable storage medium having a computer program stored thereon in a readable manner, the computer program causing a computer to execute the method according to claim 1.

18. A client device configured to process requests for thumbnail images in a video surveillance system comprising a plurality of recording servers, wherein each recording server stores video data received from at least one video surveillance camera, the client device comprising:
 a main queue configured to receive a thumbnail request including information indicating a specific video camera for which a thumbnail image is requested and a specific recording server on which video data from the specific video camera is stored;
 thumbnail request processing means configured to:
  allocate the thumbnail request to a recording server queue corresponding to the specific recording server;
  determine whether an idle resource processor associated with the recording server queue is available to process the thumbnail request;
  when the idle resource processor is available, process the thumbnail request using the idle resource processor;
  when no idle resource processor is available:
  (i) determine how many resource processors are associated with the recording server queue;
  (ii) when this is less than a maximum number, initiate a new resource processor and process the thumbnail request; and
  (iii) put the new resource processor into an idle state after processing the thumbnail request.

* * * * *